(12) United States Patent  
Kahrens

(10) Patent No.: US 11,590,894 B2  
(45) Date of Patent: Feb. 28, 2023

(54) DEVICE FOR MOUNTING AN INSIDE REAR-VIEW MIRROR IN A VEHICLE, AND VEHICLE COMPRISING SUCH A MOUNTING ARRANGEMENT

(71) Applicant: VOLKSWAGEN AKTIENGESELLSCHAFT, Wolfsburg (DE)

(72) Inventor: Dietmar Kahrens, Bergfeld (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 413 days.

(21) Appl. No.: 16/826,951

(22) Filed: Mar. 23, 2020

(65) Prior Publication Data

US 2020/0215980 A1 Jul. 9, 2020

Related U.S. Application Data

(63) Continuation of application No. PCT/EP2018/074420, filed on Sep. 11, 2018.

(30) Foreign Application Priority Data

Sep. 21, 2017 (DE) .................... 10 2017 216 764.5

(51) Int. Cl.
  *B60R 1/04* (2006.01)
  *B60R 11/00* (2006.01)

(52) U.S. Cl.
  CPC ............... *B60R 1/04* (2013.01); *B60R 11/00* (2013.01); *B60R 2011/0001* (2013.01); (Continued)

(58) Field of Classification Search
  CPC ... B60R 1/04; B60R 11/00; B60R 2011/0001; B60R 2011/0026; B60R 2011/0063; B60R 2011/0085; B60R 2011/0033
  See application file for complete search history.

(56) References Cited

U.S. PATENT DOCUMENTS 3,425,657 A 2/1969 Doyle
3,534,938 A 10/1970 Jordan et al.
(Continued)

FOREIGN PATENT DOCUMENTS

CN 102438877 A 5/2012
DE 1 813 706 6/1970
(Continued)

OTHER PUBLICATIONS

Chinese Office Action for Chinese Application No. 201880061360.9 dated Sep. 28, 2022, English Translation.

*Primary Examiner* — Boubacar Abdou Tchoussou
(74) *Attorney, Agent, or Firm* — Muncy, Geissler, Olds & Lowe, P.C.

(57) ABSTRACT

An arrangement for mounting an inside rearview mirror in a vehicle. The inside rearview mirror has a mirror head that is adjustably mounted, by the agency of a mirror base, on a base plate permanently attached to the vehicle. The mirror base is mounted on the base plate through a first support point so as to be pivotable about a vehicle transverse axis and also through a second, detachable rear support point. The first support point is formed by two bearing side pieces of the base plate. Each of the bearing side pieces has a bearing eye in which the mirror base is mounted by means of bearing axle(s) so as to be pivotable about a vehicle transverse axis. At least one bearing side piece is designed to be slotted toward and transversely to the central axis of the bearing eye for installation of the relevant bearing axle.

9 Claims, 4 Drawing Sheets

(52) U.S. Cl.
CPC ............. *B60R 2011/0026* (2013.01); *B60R 2011/0063* (2013.01); *B60R 2011/0085* (2013.01)

(56) References Cited

U.S. PATENT DOCUMENTS

| | | |
|---|---|---|
| 3,635,435 A | 1/1972 | Perison, Sr. |
| 4,848,888 A | 7/1989 | Polzer |
| 5,100,095 A | 3/1992 | Haan et al. |
| 5,487,522 A * | 1/1996 | Hook ................. B60R 1/04 248/483 |
| 7,726,623 B2 | 6/2010 | Müller |
| 8,451,332 B2 * | 5/2013 | Rawlings ............ B60R 1/04 348/148 |
| 8,931,804 B2 | 1/2015 | Yamamoto |
| 9,487,159 B2 * | 11/2016 | Achenbach ............ B60R 11/04 |
| 9,908,481 B2 | 3/2018 | Hayashi et al. |
| 10,232,803 B2 | 3/2019 | Ichihara et al. |
| 2007/0056220 A1 | 3/2007 | Wild |
| 2012/0162430 A1 * | 6/2012 | Heslin ................. B60R 1/12 348/148 |

FOREIGN PATENT DOCUMENTS

| | | |
|---|---|---|
| DE | 1 680 319 | 12/1971 |
| DE | 33 41 611 A1 | 8/1985 |
| DE | 34 45 832 A1 | 6/1986 |
| DE | 35 15 116 A1 | 10/1986 |
| DE | 86 29 506 U1 | 6/1988 |
| DE | 43 20 488 C1 | 7/1994 |
| DE | 100 12 971 A1 | 9/2001 |
| DE | 10 2007 028 162 A1 | 12/2008 |
| DE | 10 2016 101 973 A1 | 8/2016 |
| DE | 11 2015 004 838 T5 | 7/2017 |
| FR | 1 504 689 | 12/1967 |
| GB | 1 132 384 | 10/1968 |

* cited by examiner

DEVICE FOR MOUNTING AN INSIDE REAR-VIEW MIRROR IN A VEHICLE, AND VEHICLE COMPRISING SUCH A MOUNTING ARRANGEMENT

This nonprovisional application is a continuation of International Application No. PCT/EP2018/074420, which was filed on Sep. 11, 2018, and which claims priority to German Patent Application No. 10 2017 216 764.5, which was filed in Germany on Sep. 21, 2017, and which are both herein incorporated by reference.

BACKGROUND OF THE INVENTION

Field of the Invention

The present invention relates to arrangement for mounting an inside rearview mirror in a vehicle, in particular a motor vehicle. The invention also relates to a vehicle with such a mounting arrangement.

Description of the Background Art

An inside rearview mirror for a vehicle is known from DE 1 680 319 A1, which corresponds to U.S. Pat. No. 3,534,938, that is pivotably mounted on a window frame by the agency of a support arm and a base. For this purpose, the base has a first, front support point, which is formed by a hook engaging in a recess in the window frame, as well as a second, rear support point, which is formed by a mechanical mounting element in the form of an elastically deformable clamp. The clamp engages in an opening of the window frame. This makes it possible that the unit formed of an inside rearview mirror and support arm is released as a result of a certain load on this unit in that the clamp detaches from the associated opening. Moreover, DE 100 12 971 A1 describes a vehicle inside rearview mirror having a retaining plate that is mounted on an inside of a windshield, having a supporting foot that is attached to the support plate by means of a support arrangement, having a mirror housing that is attached to the supporting foot, and also having first, a front connector and a second, rear connector, wherein said connectors are designed such that the supporting foot is pivotable about a transverse axis formed by the first connector when the second connector is separated. The above-described mounting arrangements of the inside rearview mirrors have in common that the inside rearview mirrors are not securely held on the window frame or on the retaining plate when the second support point is detached or the second connector is separated, and accordingly can detach in an undefined manner in the event of a crash of the vehicle, which is associated with a head impact of a vehicle occupant against the inside rearview mirror, for example, and thus can become a safety hazard to the vehicle occupants. This is the starting point for the invention described below.

SUMMARY OF THE INVENTION

It is therefore an object of the present invention to create an arrangement for mounting an inside rearview mirror in a vehicle that, while retaining the advantages of the prior art, ensures secure retention of the inside rearview mirror on its base plate, which base plate is permanently attached to the vehicle, in the event said mirror is displaced by pivoting when the second support point is detached. It is an additional object of the invention to make available a vehicle, in particular motor vehicle, with such a mounting arrangement.

Taking as a starting point an arrangement for mounting an inside rearview mirror in a vehicle, in particular motor vehicle, wherein the inside rearview mirror has a mirror head that is adjustably mounted, by the agency of a mirror base, on a base plate permanently attached to the vehicle, wherein, viewed in the vehicle longitudinal direction (x-direction), the mirror base is mounted on the base plate on the one hand through a first, front support point so as to be pivotable about a vehicle transverse axis and on the other hand through a second, rear support point that is detachable as a result of a force "F" that exceeds a specific retaining force, the object of the invention is attained by the means that the first, front support point is formed by two bearing side pieces of the base plate that are spaced apart from each other viewed in the vehicle transverse direction (y-direction), each of which bearing side pieces has a bearing eye in which the mirror base is mounted by means of one common bearing axle or one bearing axle apiece so as to be pivotable about a vehicle transverse axis, wherein at least one bearing side piece is designed to be slotted toward and transversely to the central axis of the bearing eye for installation of the relevant bearing axle of the mirror base, and wherein said installation slot is arranged in a region of the at least one bearing side piece that faces away from the front of the vehicle.

It is prevented by this means, or at least the hazard is efficaciously reduced, that, as a result of a frontal crash of the vehicle in which, for example, in the case of a possible impact of a vehicle occupant's head with the inside rearview mirror, the second support point detaches and the mirror base along with the mirror head on the base plate executes a pivoting motion in the vehicle's direction of travel, detaches completely from the base plate, moves in an undefined manner in the passenger compartment, and causes possible injury to a vehicle occupant. In the loading case or crash case (frontal crash) salient to the invention, the forces act such that the bearing axles are subjected to forces opposite the relevant installation slot in the associated bearing eye, which is to say toward the vehicle front, and thus are held securely in the bearing eye.

In order to reduce yet further the risk of complete detachment of the mirror base along with the mirror head from the base plate, at least the section of the bearing axle that can be inserted—transversely to the central axis of the bearing eye—into the bearing eye of the applicable bearing side piece, and that is supported in the bearing eye, has a circular cross-section that is reduced by a circular segment, wherein the clearance of the slot in the associated bearing side piece is equal to or slightly larger than the diameter "d" of the bearing axle reduced by the height "h" of the circular segment. By this means, a spontaneous exit of the bearing axle(s) from their bearing eyes is prevented even better over a large pivot angle while ensuring easy installation of the mirror base on the base plate when the mirror base, including mirror head, is in the state pivoted toward the vehicle front. Preferably, the circular segment is designed and arranged on the bearing axle in such a manner that the bearing axle can be inserted into the bearing eye only in a hypothetical pivoted position of the mirror base oriented toward the vehicle front during installation of the mirror base on the base plate. This pivoted position may possibly also arise in the loading case salient to the invention or in the said crash case (frontal crash), but in that case the forces likewise act such that the bearing axle(s) are subjected to forces opposite the relevant installation slot in the associated bearing eye, and thus cannot exit the bearing eye in question through the said installation slot. As concerns the second, rear support point, which is, for example, detachable as a result of a crash event, this support point preferably has at least one retaining element. It is additionally preferred that the at least one retaining element is composed of a clamp element or clip element or a retaining spring, which is tightly connected at one end to the mirror base and at the other end is attached to the base plate, or vice versa, tightly in a form-locking and/or frictional manner, but detachably as a result of increased application of force. Alternatively, the at least one retaining element can also have a predetermined breaking point that breaks as a result of a defined, increased force. Furthermore, provision is made that the base plate is mounted on a windshield or another component of the vehicle, in particular a body component of the same. In accordance with a simple and economical embodiment of the invention, the base plate is mounted on the windshield or the other component of the vehicle by adhesive bonding.

The invention also relates to a vehicle, in particular motor vehicle, with a mounting arrangement of the above-described type.

The invention is described in detail below on the basis of the exemplary embodiments shown schematically in the drawings. However, it is not limited to these exemplary embodiments, but instead includes all embodiments defined by the patent claims. For the purposes of the present specification, the normal direction of travel of a vehicle is designated "−x" ("minus x"), the direction opposite its normal direction of travel is designated "+x" ("plus x"), the direction in the horizontal plane perpendicular to the x-direction that is to the right when viewed in the normal direction of travel (−x) is designated "+y," the direction in the horizontal plane perpendicular to the x-direction that is to the left when viewed in the normal direction of travel (−x) is designated "−y," the direction looking upward in the vertical plane perpendicular to the x-direction is designated "+z," and the direction looking downward in the vertical plane perpendicular to the x-direction is designated "−z." This method of designating the spatial directions in Cartesian coordinates corresponds to the coordinate system generally used in the automotive industry. Moreover, terms such as "front," "back," "up," and "down," as well as terms with similar semantic content, including the terms "right" and "left," are used in the same way as they are typically used for identifying directions in a motor vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
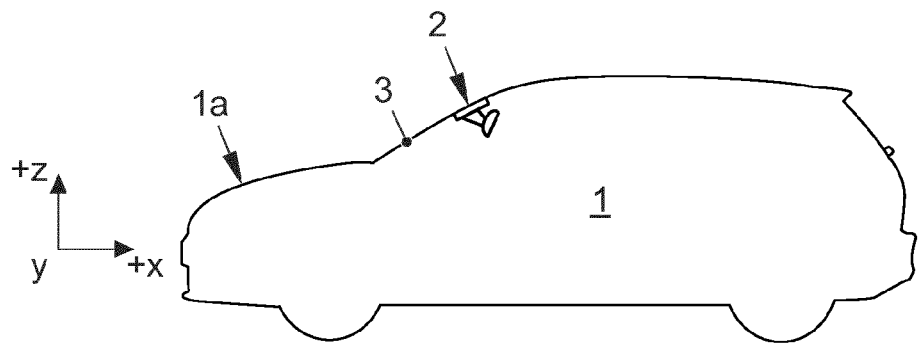
FIG. 1 illustrates extremely schematically, a vehicle, or motor vehicle, with an inside rearview mirror that is mounted on a windshield of the motor vehicle.

To begin with, FIG. 1 shows extremely schematically a vehicle 1, in the present case a passenger vehicle, with an inside rearview mirror 2 that is mounted on the windshield 3 of the vehicle 1. The invention is not restricted to an inside rearview mirror 2 mounted on the windshield 3, however, but instead also includes an inside rearview mirror 2 that is mounted on another component of the vehicle 1, in particular a body component of the same, such as a frame element of the windshield 3.

Figure 2:
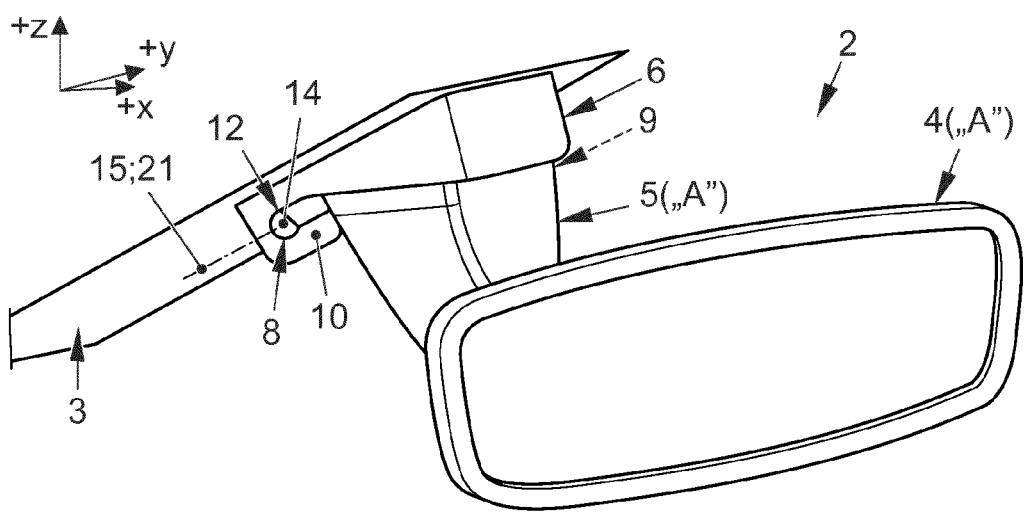
FIG. 2 is a perspective front view of the inside rearview mirror according to a first variant embodiment of the same.
Figure 3:
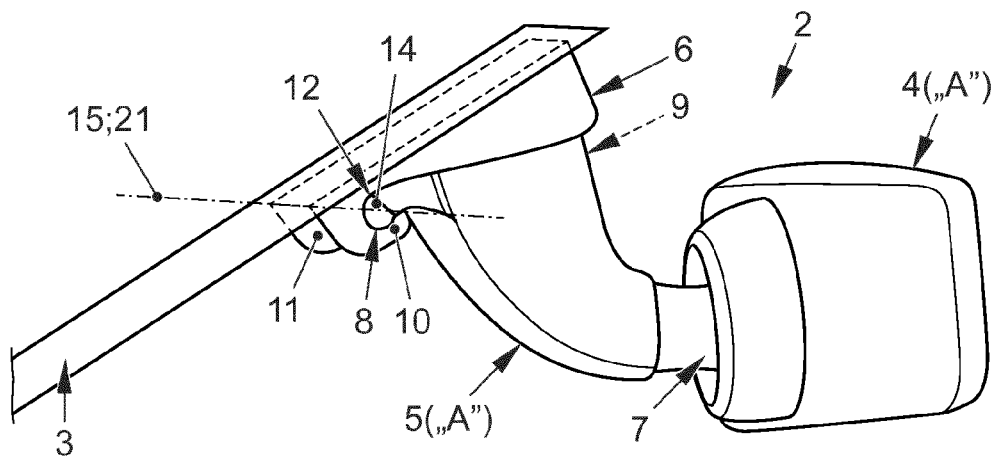
FIG. 3 illustrates the inside rearview mirror from FIG. 2 in a perspective rear view.

According to FIG. 1 to FIG. 3, the inside rearview mirror 2 has a mirror head 4 that is adjustably mounted, by the agency of a mirror base 5, on a base plate 6 permanently attached to the vehicle.

Figure 4:
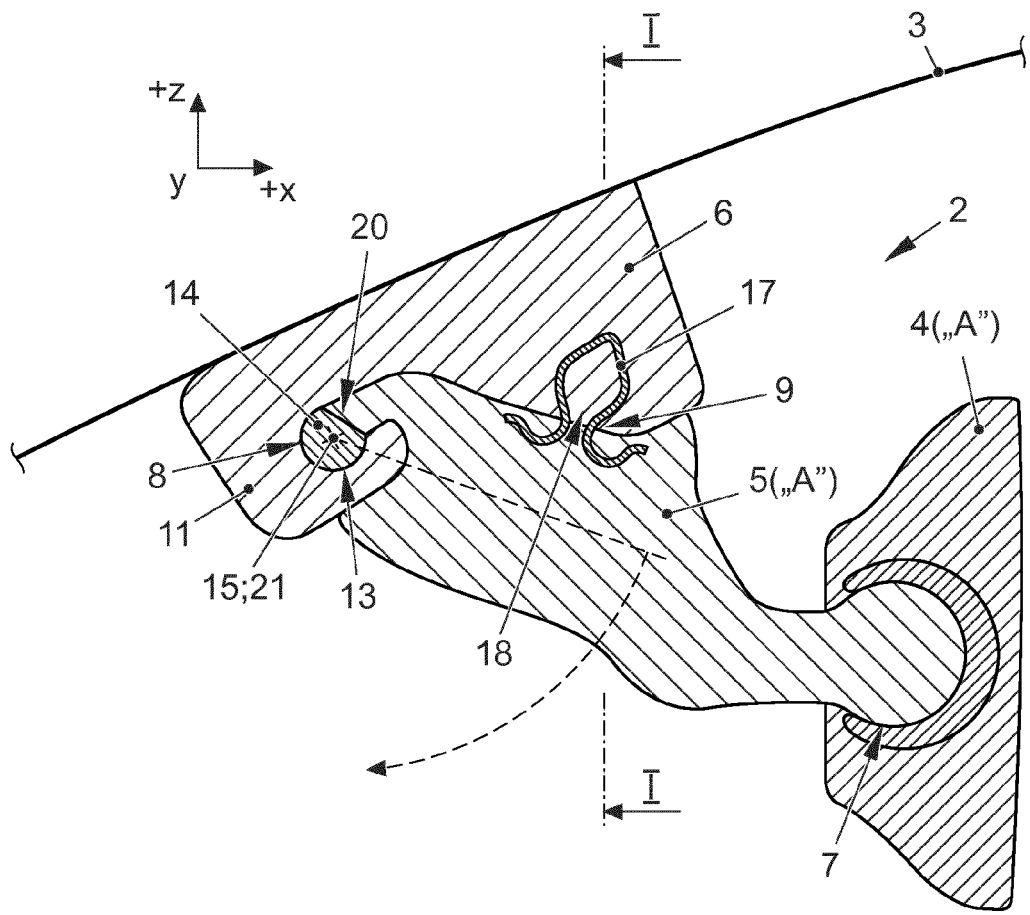
FIG. 4 is a longitudinal sectional representation of the inside rearview mirror from FIG. 2.

The base plate 6 is preferably made of a plastic, and in addition is preferably mounted on the windshield 3 by adhesive bonding. The connection between the mirror head 4 and the mirror base 5 is accomplished by means of a ball-and-socket joint 7 (see, in particular, FIG. 3 and FIG. 4). The mirror base 5 is supported on the base plate 6 by means of a first, front support point 8 and a second, rear support point 9.

The first, front support point 8 is formed by two bearing side pieces 10, 11 of the base plate 6 that are spaced apart from each other viewed in the vehicle transverse direction (y-direction), each of which bearing side pieces 10, 11 has a bearing eye 12, 13. The mirror base 5 is mounted within the bearing side pieces 11, 12 by means of one common bearing axle or—according to this exemplary embodiment—by means of one bearing axle 14 apiece so as to be pivotable about a vehicle transverse axis 15 (see, in particular, FIG. 3 and FIG. 4). Preferably, the bearing axles 14 are designed as a single piece with the mirror base 5, and in addition are preferably made of a plastic.

Figure 5:
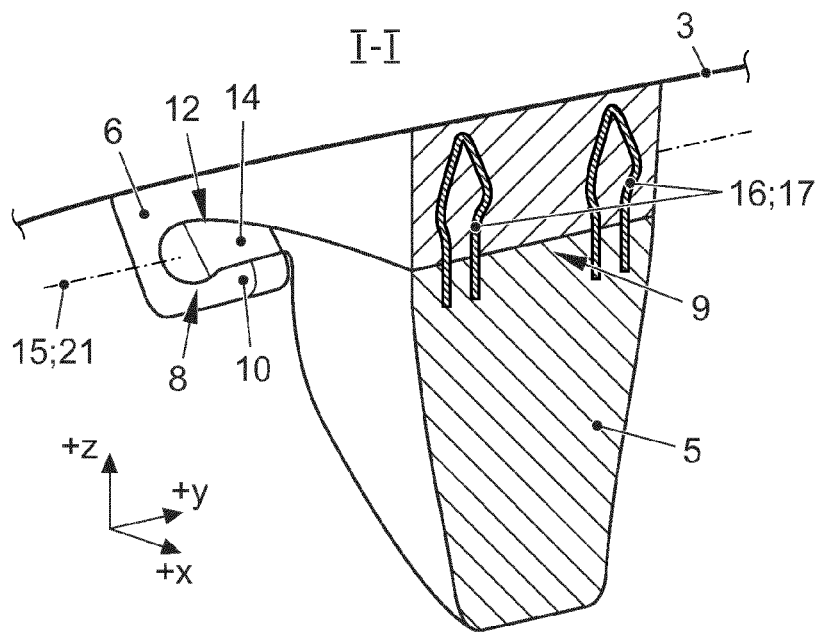
FIG. 5 is a sectional representation of the inside rearview mirror along the cutting line "I-I" from FIG. 4.
Figure 6:
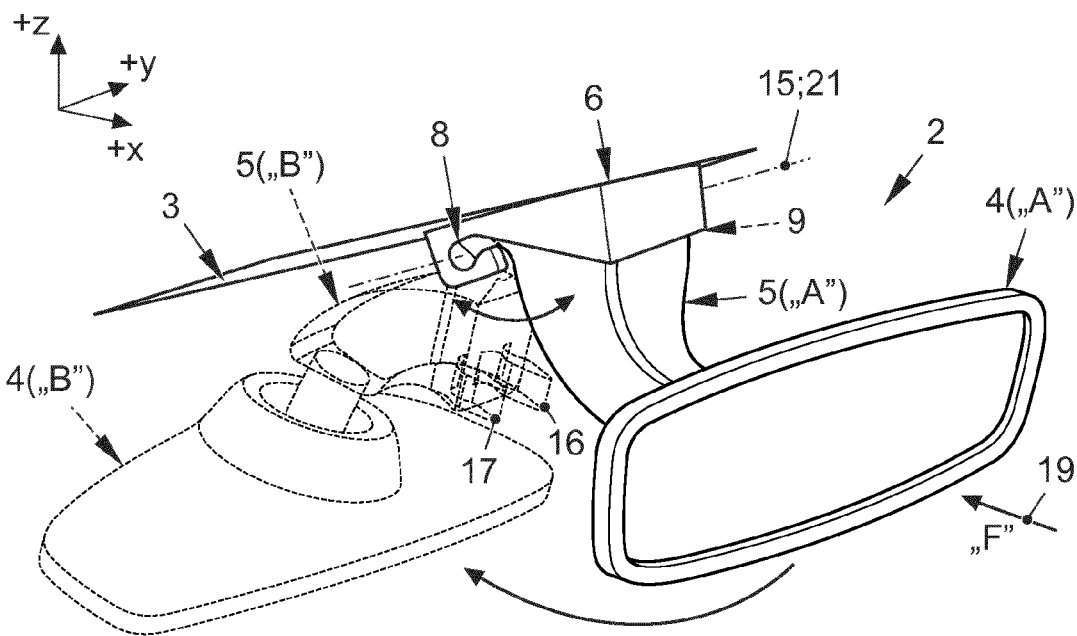
FIG. 6 is a representation of the inside rearview mirror in different operating positions.
Figure 7:
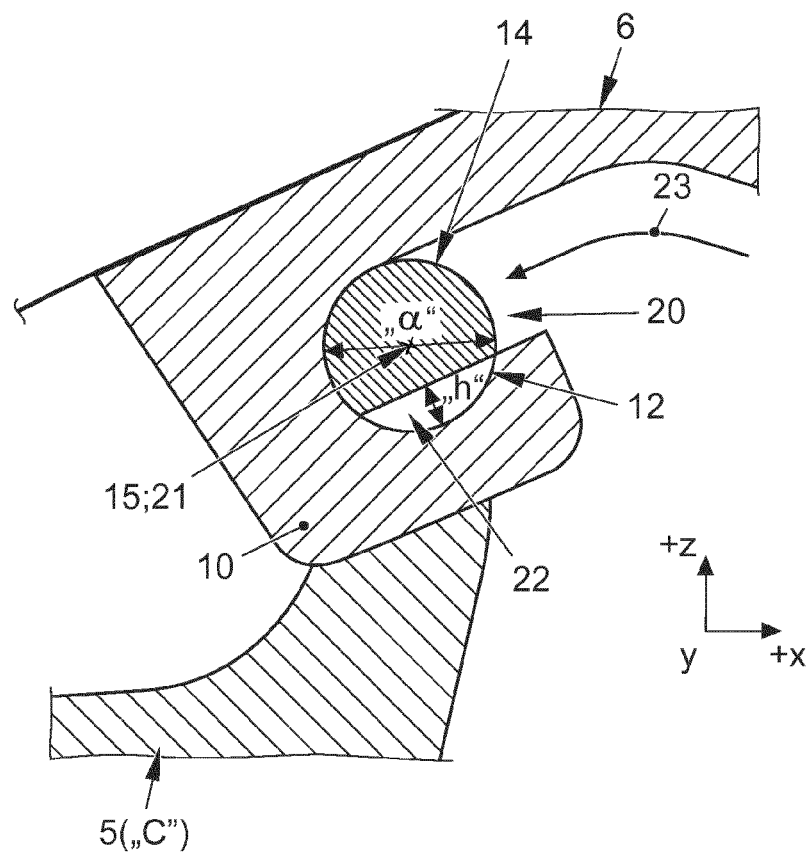
FIG. 7 is a detail view of a support point of a mirror base of the inside rearview mirror.

According to this exemplary embodiment, the second, rear support point 9 has two retaining elements 16, 17 that are spaced apart from each other viewed in the vehicle transverse direction (y-direction). Each of these elements is composed of a clamp element or clip element, which is elastic or resilient in design in this exemplary embodiment, and is tightly connected at one end to the mirror base 5 in the present case and at the other end engages in a corresponding opening 18 in the base plate 6 through form-locking and/or frictional connection (see, in particular, FIG. 4 and FIG. 5). The retaining force of the retaining elements 16, 17 is chosen such that these elements detach from the base plate 6 as a result of a specific increased application of force to the mirror head 4 and/or mirror base 5. For example, the said increased application of force can result, as indicated in FIG. 6 by the direction arrow 19, from an impact (force "F") of the head of a vehicle occupant due to a frontal crash event of the vehicle 1. In this respect, FIG. 6 shows the mirror head 4 along with the mirror base 5 in two operating positions, on the one hand in a functional position "A" (solid lines) for the intended use of the inside rearview mirror 2, and on the other hand in a safety position "B" (dashed lines) into which the mirror head 4 along with the mirror base 5 is pivoted toward the vehicle front as a result of the said head impact (force "F").

As is further evident from FIG. 2 to FIG. 7, at least one of the bearing side pieces 10, 11 is slotted in design for installation of the applicable bearing axle 14 on the base plate 6 of the mirror base 5. The installation slot 20 extends transversely to the central axis 21 of the bearing eye 12, 13, which corresponds to the aforementioned vehicle transverse axis 15, toward the bearing eye 12, 13. Preferably, each bearing side piece 10, 11 has said installation slot 20.

As is additionally evident from FIG. 2 to FIG. 7, the installation slots 20 (only one installation slot 20 is shown in the present case) are each located in a region of the relevant bearing side piece 10, 11 that faces away from the vehicle front 1a (see FIG. 1) when viewed in the vehicle longitudinal direction (x-direction).

It can furthermore be seen in FIG. 2 to FIG. 7 that at least the section of the bearing axle 14 that can be inserted— transversely to the said central axis 21 of the bearing eye—into the bearing eye 12, 13 of the applicable bearing side piece 10, 11, and that is supported in the bearing eye 12, 13, has a circular cross-section that is reduced by a circular segment 22 (see FIG. 7, in particular), wherein the clearance of the installation slot 20 in the associated bearing side piece 10, 11 is equal to or slightly larger than the diameter "d" of the bearing axle 14 reduced by the height "h" of the circular segment 22. As a result, the installation of the bearing axles 14 of the mirror base 5 on the base plate 6 is permitted only in a hypothetical pivoted position "C" of the mirror base 5 oriented toward the vehicle front (see the situation in FIG. 7), in that the bearing axles 14 are inserted into the relevant installation slot 20 in said pivoted position "C" in accordance with the direction arrow 23 from vehicle rear to vehicle front, and are guided to the bearing eye 12, 13. Pivoting the mirror base 5 back causes the retaining elements 16, 17 to be inserted into the respective associated opening 18 of the base plate 6 in a locking manner (see the situation in FIG. 4).

Easy installation of the mirror base 5 on the base plate 6 when the mirror base 5 is in the state pivoted toward the vehicle front is ensured as a result of this joint, and in addition, a spontaneous exit of the bearing axle(s) 14 from their bearing eyes 12, 13 is prevented even better over a large pivot angle. The pivoted position "C" (FIG. 7) for installation of the mirror base 5 may possibly also arise in the loading case salient to the invention or in the said crash case (frontal crash), but in that case the forces then act on the mirror base 5 and its bearing axle(s) 14 such that the latter are subjected to forces opposite the relevant installation slot 20 in the associated bearing eye 12, 13, and thus cannot exit the bearing eye 12, 13 in question through the said installation slot 20.

Figure 8:
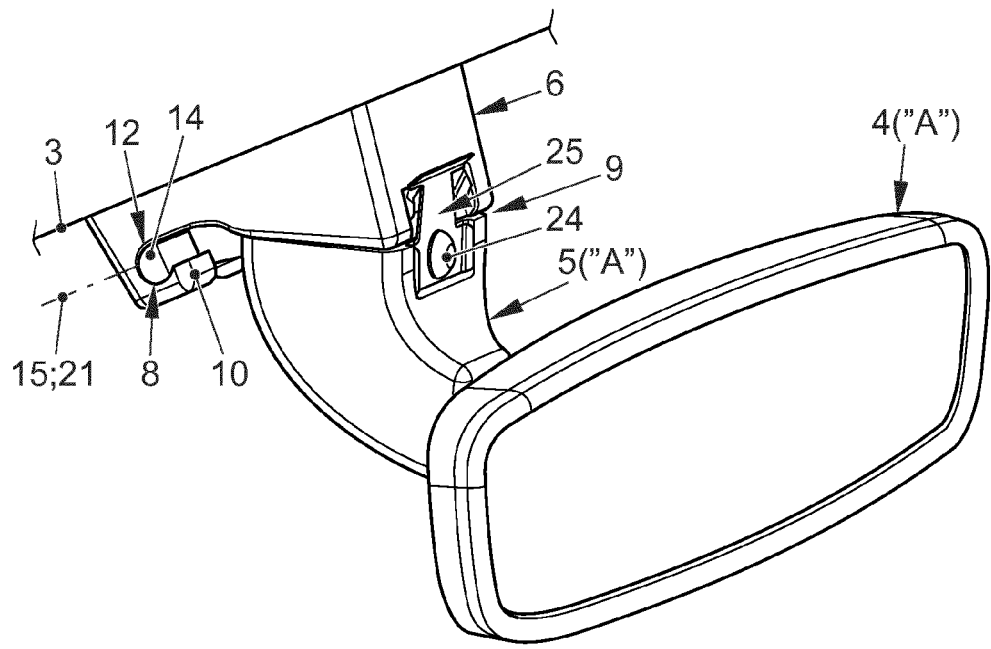
FIG. 8 is a perspective front view of the inside rearview mirror according to a second variant embodiment of the same.
Figure 9:
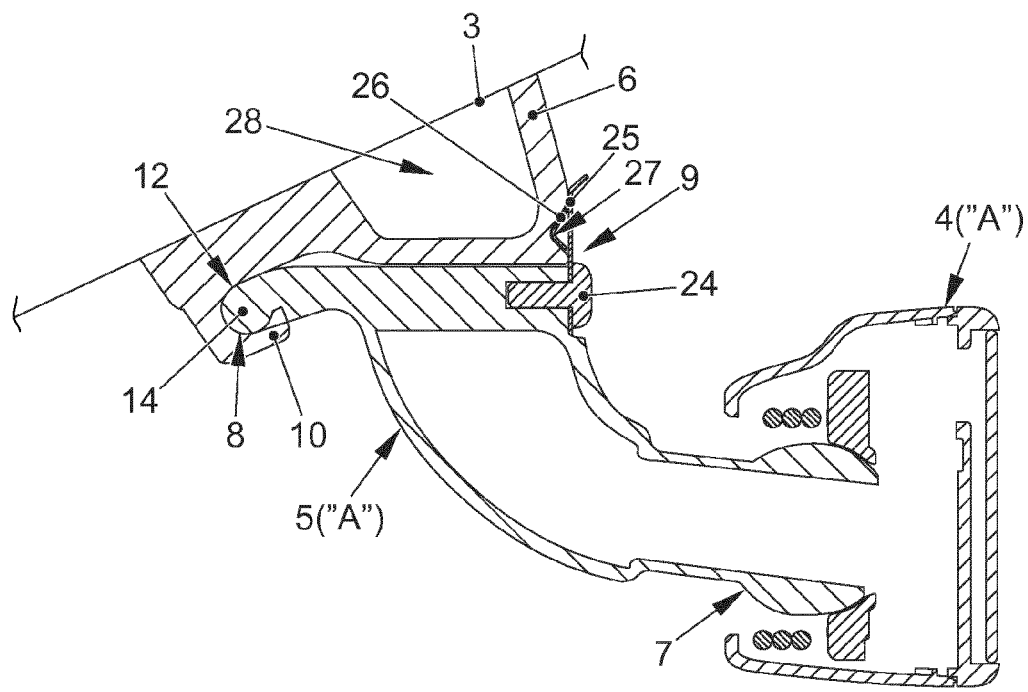
FIG. 9 is a longitudinal sectional representation of the inside rearview mirror from FIG. 8.

The variant embodiment of the invention from FIG. 8 and FIG. 9 differs from the above-described variant embodiment firstly by a different design of the second, rear support point 9. This support point 9 is distinguished by a retaining element 25 in the form of a retaining spring mounted on the mirror base 5 from the outside by means of at least one screw 24, which spring is designed with at least one lock 26 that locks under preloading with a mating lock 27 of the base plate 6 in the installed state. The retaining spring is composed of a spring steel sheet which, according to this exemplary embodiment, has a lock 26 in the form of a shaped projection that is received in a form-locking manner by the mating lock 27 in the form of a recess in the base plate 6. However, the invention is not limited to one lock 26, but also encompasses two or more lock 26 on the retaining element 25, or two or more retaining elements 25 equipped with at least one lock 26.

The retaining force of the retaining element 25 is chosen such that the element detaches from the base plate 6 as a result of a specific increased application of force to the mirror head 4 and/or mirror base 5. In conformity with the above-described first variant embodiment of the invention (see FIG. 6), the said increased application of force can result, for example, from an impact (force "F") of the head of a vehicle occupant as a result of a frontal crash event of the vehicle 1.

Also shown in FIG. 9 is a base plate 6 that has, on the windshield side, an opening 28 for placement in the same of a sensor, such as, e.g., for placement of a rain sensor or the like. Such an opening can also be provided in the base plate 6 according to the first variant embodiment of the invention, and accordingly is also included by the invention.

The above-described exemplary embodiments are directed toward retaining elements 16, 17; 25 in the form of clamp elements or clip elements or a retaining spring 25, which are connected or can be connected to the base plate 6 through form-locking and/or frictional connection. However, the invention is not limited to these concrete joints, but instead also includes retaining elements 16, 17, 25 that are tightly connected to both the mirror base 5 and the base plate 6, but each have a predetermined breaking point that breaks or fails as a result of increased application of force.

Furthermore, the invention also is not limited to the preferred embodiment of the base plate 6 with two slotted bearing side pieces 10, 11, but instead also includes an embodiment in which only one of the bearing side pieces 10, 11 is slotted in design. In this case, in contrast to the above-described embodiment, installation takes place in such a manner that the hypothetical pivoted position "C" already described above of the mirror base 5 (FIG. 7) is established first, after which one bearing axle 14 is inserted axially or as axially as possible from the inside of the bearing side piece into the bearing eye 13 of the unslotted bearing side piece 11, and finally the other bearing axle 14 is inserted into the bearing eye 12 of the other bearing side piece 10 as already described above, namely transversely to the central axis 21 of the said bearing eye 12.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. An arrangement for mounting an inside rearview mirror in a vehicle, the arrangement comprising:
   a mirror base;
   a mirror head that is adjustably mounted, via the mirror base, on a base plate permanently attached to the vehicle,
   wherein,
   wherein, viewed in a vehicle longitudinal direction, the mirror base is mounted on the base plate through a first, front support point so as to be pivotable about a vehicle transverse axis and through a second, rear support point that is detachable as a result of a force "F" that exceeds a specific retaining force, wherein the first, front support point is formed by two bearing side pieces of the base plate that are spaced apart from each other viewed in a vehicle transverse direction, each of the two bearing side pieces having a bearing eye in which a bearing axle of the mirror base is mounted so as to be pivotable about the vehicle transverse axis, wherein at least one of the two bearing side pieces has an installation slot that includes the bearing eye and that is slotted toward and transversely to a central axis of the bearing eye for installation of the bearing axle of the mirror base, and wherein the installation slot is arranged in a region of the at least one of the two bearing side pieces that faces away from a front of the vehicle.

2. The arrangement according to claim 1, wherein at least a section of the bearing axle that is insertable, transversely to the central axis of the bearing eye, into the bearing eye of the at least one of the two bearing side pieces, and that is supported in the bearing eye, has a circular cross-section that is reduced by a circular segment, and wherein a clearance of the installation slot in the at least one of the two bearing side pieces is equal to or slightly larger than a diameter "d" of the bearing axle reduced by a height "h" of the circular segment.

3. The arrangement according to claim 2, wherein the circular segment is arranged on the bearing axle such that the bearing axle is insertable into the bearing eye only in a pivoted position "C" of the mirror base that is oriented toward the front of the vehicle during installation of the mirror base on the base plate.

4. The arrangement according to claim 1, wherein the second, rear support point has at least one retaining element.

5. The arrangement according to claim 4, wherein the at least one retaining element is composed of a clamp element or clip element or a retaining spring, which is tightly connected at one end to the mirror base and at the other end is attached to the base plate tightly in a form-locking and/or frictional manner, or vice versa, but is detachable as a result of increased application of force.

6. The arrangement according to claim 4, wherein the at least one retaining element has a predetermined breaking point.

7. The arrangement according to claim 1, wherein the base plate is mounted on a windshield or another body component of the vehicle.

8. The arrangement according to claim 7, wherein the base plate is mounted on the windshield or the other body component of the vehicle by adhesive bonding.

9. A vehicle, comprising the mounting arrangement according to claim 1.

* * * * *